(12) United States Patent
Schmeier et al.

(10) Patent No.: US 11,414,038 B2
(45) Date of Patent: Aug. 16, 2022

(54) STEERING WHEEL WITH VIBRATION DAMPING MASS

(71) Applicant: Autoliv Development AB, Vargarda (SE)

(72) Inventors: Knut Schmeier, Fürstenfeldbruck (DE); Tomasz Skoneczny, Dachau (DE); Dominik Zelmanski, Neustadt a.d. Donau (DE); Felix Pollatschek, Munich (DE); Klaus Massanetz, Wartenberg (DE); Marcus Weber, Untertheres (DE); Holger Zang, Bergkirchen (DE); Sven Hoffmann, Dachau (DE); Thomas Reiter, Vierkirchen (DE); Wolfram Engelhardt, Dachau (DE); Alexander Feicht, Sigmertshausen (DE); Michael Gruhne, Augsburg (DE)

(73) Assignee: Autoliv Development AB, Vargarda (SE)

( * ) Notice: Subject to any disclaimer, the term of this patent is extended or adjusted under 35 U.S.C. 154(b) by 94 days.

(21) Appl. No.: 16/666,723

(22) Filed: Oct. 29, 2019

(65) Prior Publication Data

US 2020/0130630 A1    Apr. 30, 2020

(30) Foreign Application Priority Data

Oct. 29, 2018 (DE) .......................... 102018126960.9
Feb. 19, 2019 (DE) .......................... 102019104158.9

(51) Int. Cl.
*B60R 21/203* (2006.01)
*B60Q 5/00* (2006.01)
*B60R 21/2165* (2011.01)

(52) U.S. Cl.
CPC .......... *B60R 21/2037* (2013.01); *B60Q 5/003* (2013.01); *B60R 21/21658* (2013.01)

(58) Field of Classification Search
CPC .......... B60R 21/2037; B60R 21/21658; B60R 21/203; B60R 21/2035; B60Q 5/003; B60Q 5/001; B60Q 5/00; B62D 7/222
(Continued)

(56) References Cited

U.S. PATENT DOCUMENTS 6,354,622 B1 * 3/2002 Ulbrich ............... B60R 21/2037
                                                    280/728.2
6,464,247 B1 * 10/2002 Laue ...................... B62D 7/222
                                                    280/728.2
(Continued)

FOREIGN PATENT DOCUMENTS

DE       102008060135 A1     6/2010
EP         1790536 A2 *      5/2007 ............. B60Q 5/003

*Primary Examiner* — Keith J Frisby
(74) *Attorney, Agent, or Firm* — Foley & Lardner LLP

(57) ABSTRACT

A steering wheel includes a steering wheel body and a base. The base carrying an inflator and an airbag package, such that the base, the inflator and the airbag package form a first sub-assembly. The base is connected to the steering wheel body at least indirectly via at least one elastic element, such that the sub-assembly can move relative to the steering wheel body in at least one direction so that the whole sub-assembly serves as a vibration damping mass. The steering wheel also includes a cover element with a roof extending over the airbag package, and at least one horn sensor generating a signal when a pressing force exceeding a predefined value is applied to the roof. The cover element is not rigidly connected to the base, such that the sub-assembly can move relative to the steering wheel body under deformation of the elastic element while the cover element does not move relative to the steering wheel body.

11 Claims, 4 Drawing Sheets

Figure 1:
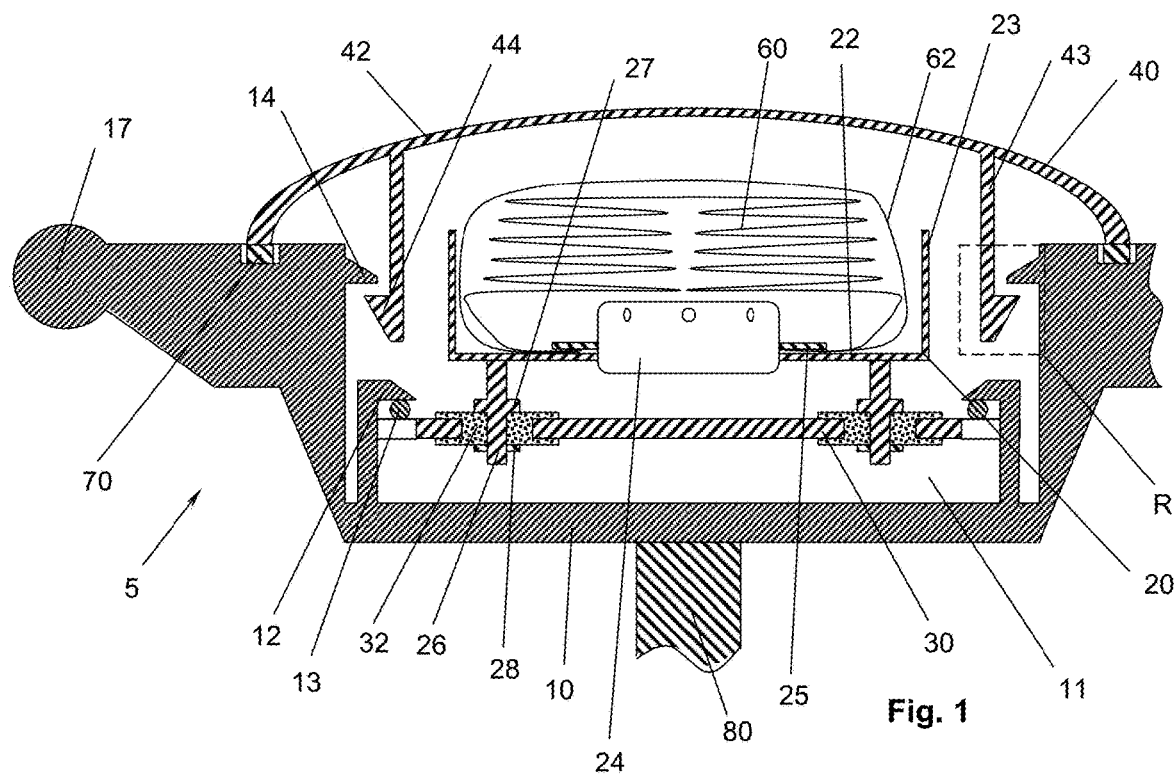

(58) Field of Classification Search
USPC .............................................. 280/731, 728.2
See application file for complete search history.

(56) References Cited

U.S. PATENT DOCUMENTS

| 8,733,203 B2 | 5/2014 | Kondo et al. |
| 2011/0089672 A1* | 4/2011 | Nebel ................. B60R 21/2037 |
| | | 280/728.2 |

\* cited by examiner

STEERING WHEEL WITH VIBRATION DAMPING MASS

The invention refers to a steering wheel with a vibration damping mass.

Almost every steering wheel of a car, bus or truck comprises a steering wheel body and an airbag module being located in the hub area of this steering wheel body. This airbag module has an airbag package and an inflator for filling the airbag of this airbag package with gas. The airbag package is always covered by the roof of a cover element. Often, the outer surface of this roof serves as an actuation surface for the horn of the vehicle.

It is a known problem that vibrations, especially vibrations of the motor of the vehicle, are introduced into the steering wheel via the steering column. Of course, this is unpleasant for the driver, so it is desired to reduce the vibrations of the steering wheel, especially the vibrations of the steering wheel body whose rim is held by the driver. In order to reduce the vibrations of the steering wheel body it is known to use a vibration damping mass that is coupled to the steering wheel body via at least one elastic element, such that this damping mass can move relative to the steering wheel body against the restoring force of the elastic element. By this, the vibration of the steering wheel body is damped.

For example from DE 10 2008 060 135 A1 it is known to use the inflator as a damping mass.

Generic U.S. Pat. No. 8,733,203 B2 proposes to use basically the whole airbag module comprising a housing, the inflator, the airbag package and the cover as a damping mass. This has the advantage that the damping mass is increased.

Starting from this prior art it is the task of the invention to further improve a generic steering wheel.

This task is solved by a steering wheel having the features of claim 1.

According to the invention the cover element is not rigidly connected to the base, such that a first sub-assembly comprising the base, the inflator and the airbag package can move relative to the steering wheel body while the cover element does not move relative to the steering wheel body. When such a movement of the first sub-assembly occurs due to a vibration of the steering column, the elastic element which connects the first sub-assembly to the steering wheel at least indirectly is resiliently deformed. Preferably there is no direct mechanical contact between the first sub-assembly and the cover element. Since the cover element is usually relatively light-weight, the amount of the damping mass is only slightly reduced in relation to the concept of the generic steering wheel, and the advantage that the airbag package moves together with the inflator is maintained. The inventive advantage is that the cover element and especially its roof does not move together with the first sub-assembly. So, the gaps between the roof and the steering wheel can be very small and it is even possible to attach the cover element in a non-movable way to the steering wheel body, so that electronic horn sensors like for example piezo elements can be used. But it is also possible to attach the cover element to the steering wheel body in a "traditional way" that allows a pressing down of the cover element against the steering wheel body. In any case the positioning of the cover element to the steering wheel can be very precise since there can be no—or only a short—tolerance chain between the cover element and the steering wheel body.

In a first principal embodiment there is no force-transmitting connection between the cover element and the first sub-assembly (except via the steering wheel body) so that the first sub-assembly is not affected when a force is applied to the roof of the cover element in order to actuate the horn.

In order to surely withstand the high forces that arise during deployment of the airbag, it can be preferred to provide at least one restraining means that is without function as long as the airbag of the airbag package is not deployed but restrains the cover element when the airbag deploys. This restraining means can act between the cover element and the steering wheel body or between the cover element and the base. "Being without function" means that there is a cover-side restraining element and another restraining element (steering-wheel-body-side or base-side) that are not in mechanical contact to one another during normal operation of the vehicle, but come into mechanic contact when the attachment between the cover element and the steering wheel body fails when the airbag deploys.

In a second principal embodiment the first sub-assembly and the cover element are parts of a second sub-assembly that can be pressed down against the steering wheel body in order to actuate the horn. This second sub-assembly further comprises a carrier connecting the cover element and the first sub-assembly. For example one further elastic element (for example a spring) can extend from this carrier so that the carrier can be pressed down. But also in this embodiment the first sub-assembly can move relative to the cover element under deformation of the at least one elastic element.

The invention will now be described by means of preferred embodiments in view of the figures.

Figure 2:
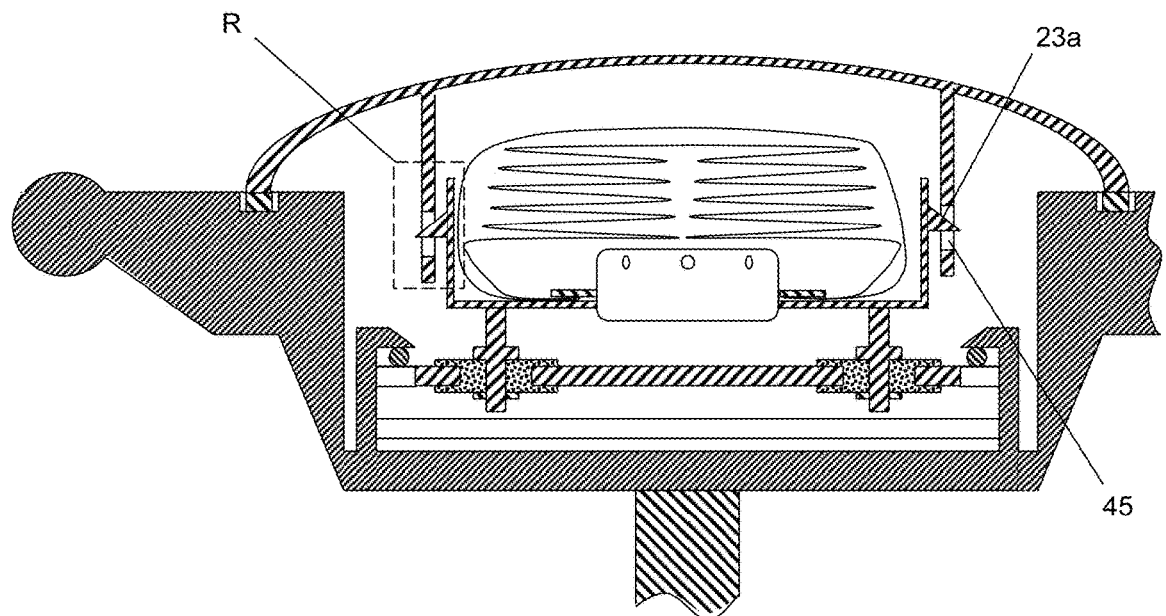
Figure 3:
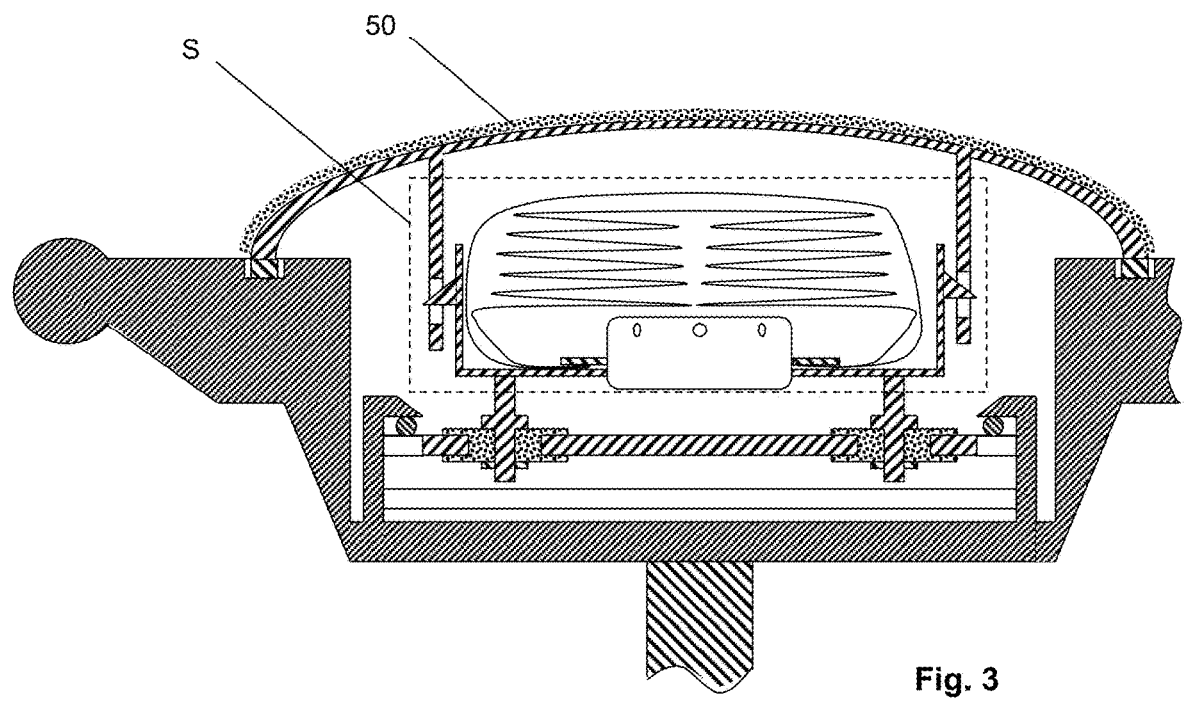
Figure 4:
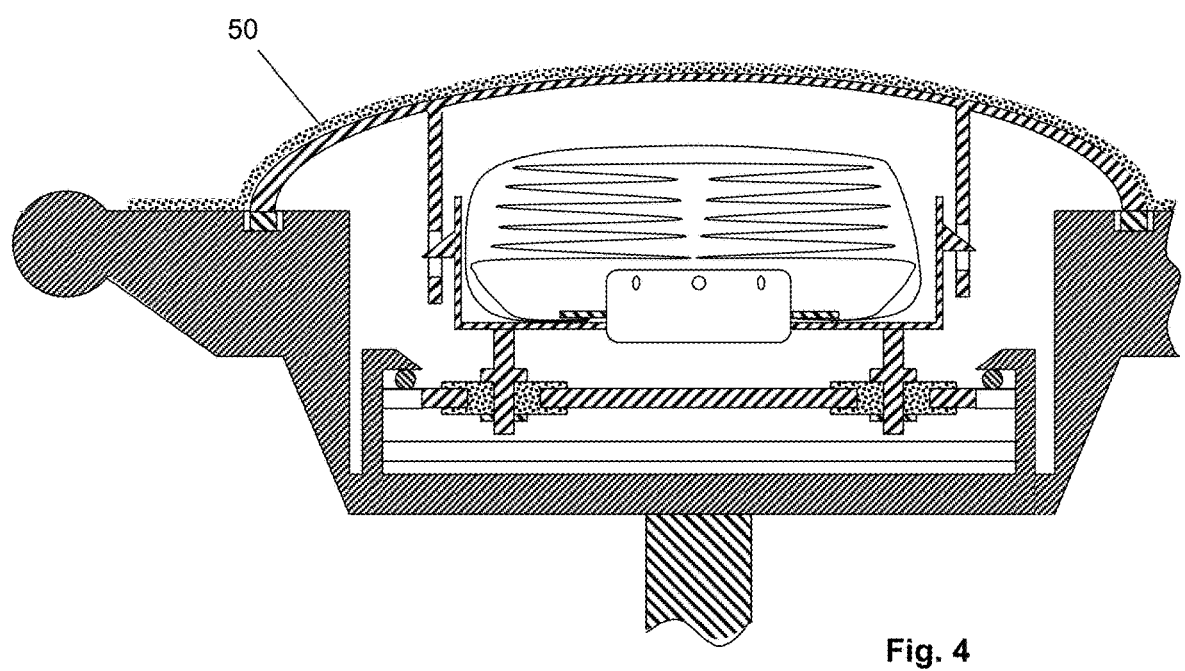
Figure 5:
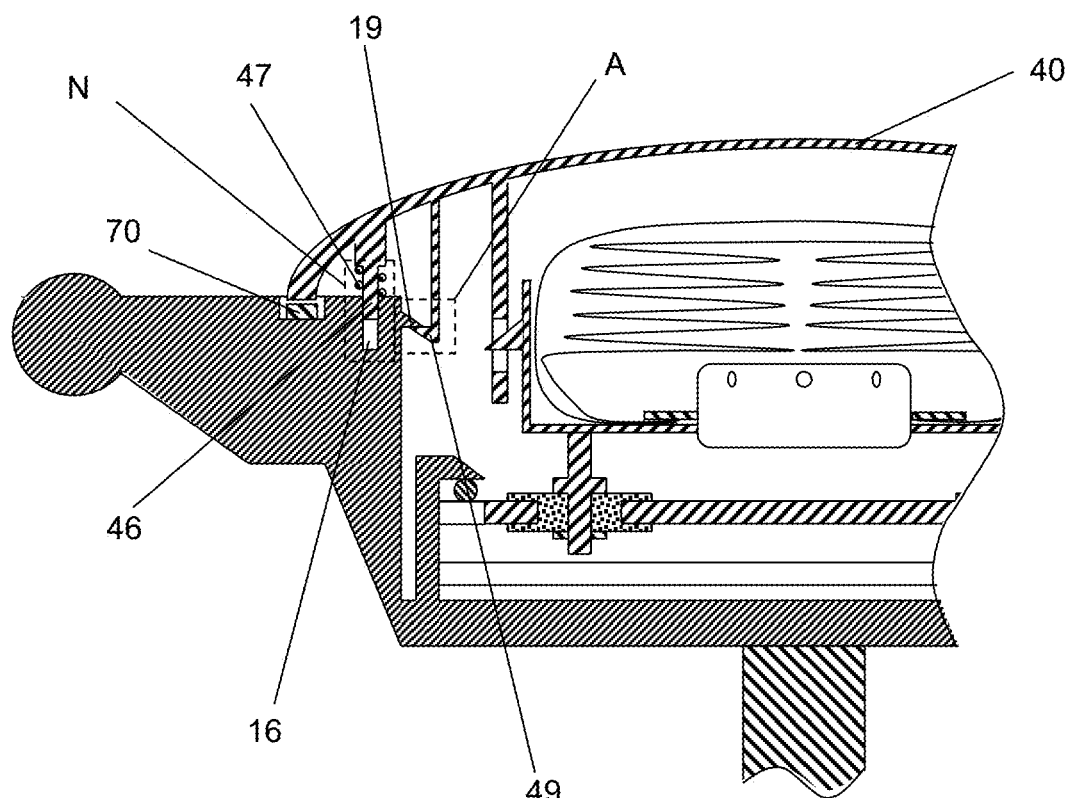
Figure 6:
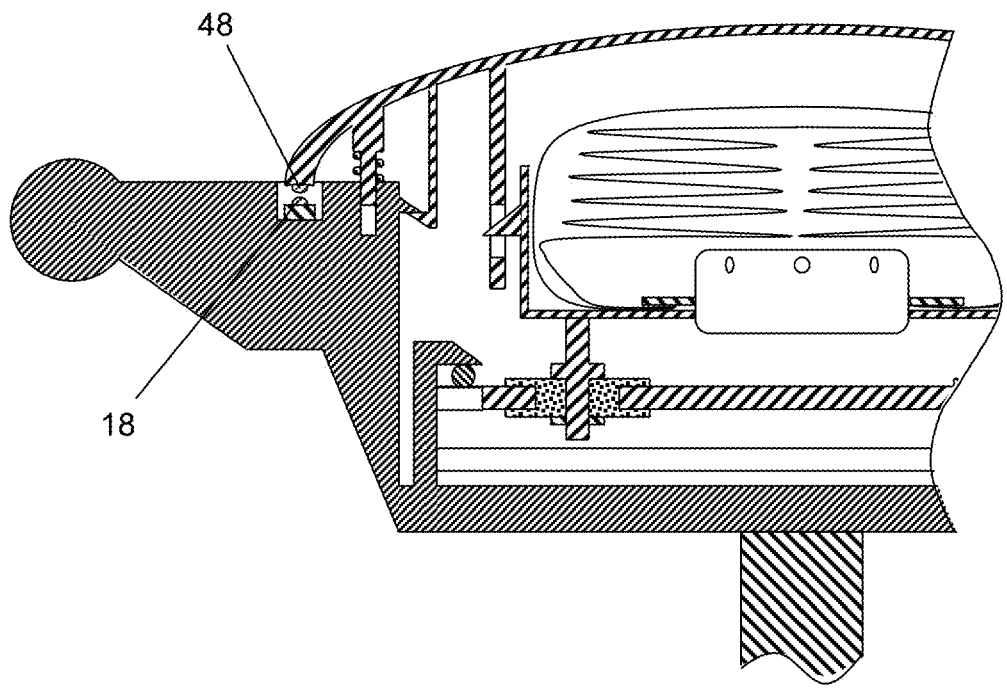
Figure 7:
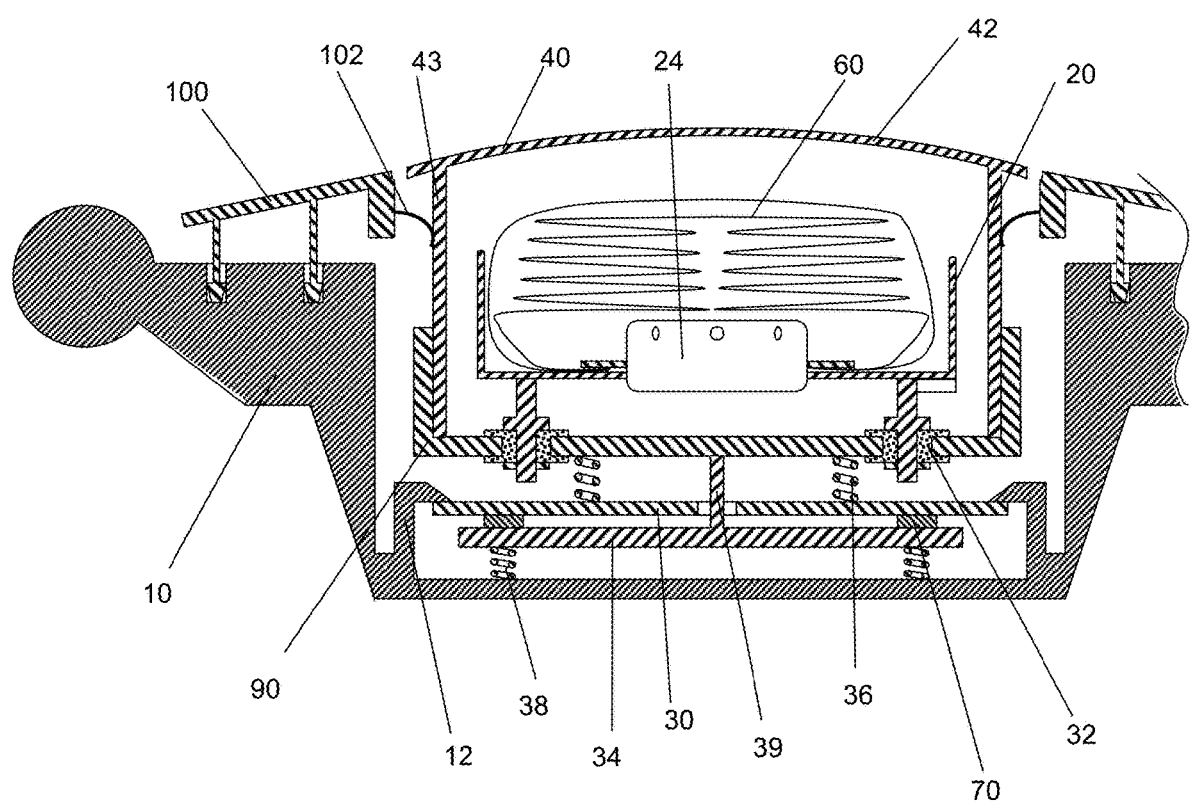

In the Figures:

FIG. 1 shows a first embodiment of a steering wheel according to the invention in a schematic cross sectional view, FIG. 2 shows a second embodiment in a representation according to FIG. 1, FIG. 3 shows a variation to the embodiment shown in FIG. 2, FIG. 4 shows a variation to the embodiment shown in FIG. 3, FIG. 5 shows a third embodiment of the invention in a representation according to FIGS. 1 and 2, FIG. 6 shows a variation to the embodiment shown in FIG. 5, and FIG. 7 a second principal embodiment of the invention in a representation according to FIG. 1.

FIG. 1 shows a first embodiment of an inventive steering wheel 5 in a schematic cross sectional view. Additionally to the steering wheel 5 a steering column 80 to which the steering wheel 5 is mounted when in use is shown. The direction of the steering column 80 defines the axial direction.

The steering wheel 5 comprises a steering wheel body 10 having a rim 17 and showing a recess 11 in the hub area. In this recess 11 at least sections of a sub-assembly are accommodated. This sub-assembly comprises a base 20 in form of a housing, an inflator 24 (most often in a form of a pyrotechnic gas generator) attached to the base 20, and an airbag package 60, also attached to the base 20. In the embodiment shown the airbag package 60 is surrounded by a wrapper 62 and is held on the base 20 by means of a flange 25 of the inflator 24. This is a standard technique but not mandatory for this invention. As it has already been said, the base 20 is in form of a housing, so it has a bottom 22 and a side wall 23. The inflator 24 and the airbag package 60 are attached to the bottom 22. The base 20 is attached to a mounting plate 30 which in turn is mounted to the steering wheel body in a rigid manner. In the embodiment shown this mounting plate 30 is connected to the steering wheel body by means of mounting hooks 12 and a wire 13. It would for example also be possible to attach the mounting plate 30 to the steering wheel body 10 by means of screws.

For the connection between the base and the mounting plate 30 studs 26 (for example 3 or 4 studs) extend from the base 20 (namely from the bottom 22 of the housing) through elastic elements 32 that are held in through holes in the mounting plate 30. The elastic elements thus also have through holes and can for example consist of rubber or a rubber-like material. In order to fix the studs 26 to the elastic elements 32 the studs 26 each show a collar 27 and a nut 28 is screwed onto the part of the stud 26 located on the other side of the elastic element 32 than the collar 27. So, the sub assembly comprising the base, the inflator and the airbag package is connected to the steering wheel body 10 via the elastic elements 32 so that it can move to some extent relative to the steering wheel body 10, especially in the plane perpendicular to the axial direction, against the restoring force of the elastic elements. In the embodiment shown these elastic elements 32 are placed between studs extending from the base and the mounting plate 30 fixed to the steering wheel body, but it needs to be mentioned that this is a preferred embodiment, but not the only one possible. It would for example also be possible to place the elastic elements 32 directly between elements of the sub-assembly and the steering wheel body, or to attach the sub-assembly rigidly to a mounting plate and to attach this mounting plate to the steering wheel body via at least one elastic element. Additionally it should be mentioned that other types of connections between the base and the mounting plate 30 via elastic elements are possible, especially without the use of studs. The important point is (as has already been mentioned) that the whole sub-assembly can move relative to the steering wheel body against the restoring force of the elastic elements, such that this complete sub-assembly having the mass of the base 20, the inflator 24 and the airbag package 60 can act as a damping mass.

A roof 42 of a cover element 40 spans over the hub area of the steering wheel body 10 and thus also covers the sub-assembly with the airbag package 60. This cover element 40 usually is an injection molded plastic part. As can be seen from FIG. 1 a side wall 43 extends from the roof 42. As is usual with steering wheels 5, the outer surface of the roof 42 serves as an actuation surface for the horn of the vehicle. So, at least one horn sensor 70 is provided between the cover element 40 and the steering wheel body 10. Usually at least three such horn sensors 70 are provided. The embodiment shown in FIG. 1 is a so called 'no travel horn' meaning that the cover element 40 does not move or moves only to a very small amount relative to the steering wheel body 10 even if a pressure is applied to the outer surface of the roof 42 of this cover element 40. In this case the horn sensors 70 are in form of pressure sensitive electronic elements, such as piezo elements.

In the embodiment shown in FIG. 1 the areas of the cover element 40 which contact the horn sensors 70 could for example be glued to the horn sensors, which in turn are attached to the steering wheel body 10 by any suitable means. So, a perfect fit between the cover element (and especially its roof 42) and the steering wheel body 10 can be achieved. But since such a kind of a connection between the cover element 40 and the steering wheel body 10 will not be securely sufficient to withstand the forces which arise when the airbag deploys, additional restraining means R are provided which hold the cover element at the steering wheel body 10 when the regular connection between the cover element 40 and the steering wheel body 10 fails during deployment of the airbag. In the embodiment shown in FIG. 1 these additional restraining means R are comprised of steering-wheel-side restraining elements 14 and cover-element side restraining elements 44. In the state of normal use (meaning that the cover element 40 is directly or indirectly held by the steering wheel body 10) these elements 14, 44 are not in direct mechanical contact to each other so that the restraining means R do not interfere with the above described connection between the cover element 40 and the steering wheel body 10.

One can see clearly in FIG. 1 that the cover element 40 is not in mechanical contact to the sub-assembly such that the movement of this sub-assembly relative to the steering wheel body 10 is not transferred to the cover element 40.

FIG. 2 shows a variation to the embodiment of FIG. 1. The difference is that the additional restraining means act between the cover element 40 and the base 20, namely between the side wall 43 of the cover element and the side wall 23 of the housing. Here, the side wall 23 of the housing has base side hooks 23a (base-side restraining elements) which extend through windows 45 in the side wall of the cover element 40 (cover-element-side restraining elements). In normal stage of operation the hooks 23a (or any other part of the base) are not in contact to the cover element 40, but the hooks 23a restrain the cover element 40 when a regular connection between the cover element 40 and the steering wheel body 10 fails on deployment of the airbag. Since there is no mechanical connection between the sub-assembly and the cover element 40, a movement of the sub-assembly relative to the steering wheel body 10 is not transferred to the cover element 40.

As is shown in FIG. 3 the outer surface of the roof 42 can be covered by an additional outer layer 50 to enhance the optical appearance. Since the roof 42 does not move relative to the steering wheel body 10, this outer layer 50 could also extend over adjacent areas of the steering wheel body 10. Although not shown in the Figures this possibility also applies to the example embodiment shown in FIG. 1.

As will now be explained in view of the embodiment shown in FIGS. 5 and 6, the inventive concept can also be applied to steering wheels 5 whose cover element 40 can be pressed down against the steering wheel body 10 in order to actuate the horn. Here, at least one spring 47 (usually more than one spring) is located between the cover element 40 and the steering wheel body 10. In this case positioning means positioning the cover element 40 to the steering wheel body 10 will be necessary. In the embodiment shown in FIGS. 5 and 6 distinct axial positioning means A and non-axial positioning means N are provided. The non-axial positioning means N can especially be in form of bars 46 and positioning holes 16 and the axial positioning means A could especially comprise pairs of hooks and loops or pairs of hooks 19, 49 being in contact to one another as long as the cover element 40 is not pressed down. It would also be possible to use combined axial and non-axial positioning means as is generally known. Often these positioning means will not be sturdy enough in order to secure the cover element 42 to the steering wheel body 10 in case of deployment of the airbag. So it will often be preferred to provide additional restraining means R also in this case. In the example embodiment of FIG. 5 these restraining means R are made like the ones the example embodiments of FIG. 2, but it would of course also be possible to provide additional restraining means between the cover element and the steering wheel body. In the case that the cover element can be pressed down against the steering wheel body against the force of at least one spring 47, the horn sensor 70 can for example be in form of a micro switch (as is shown in FIG. 6) or traditionally in form of two contacts 18, 48 (FIG. 6).

FIG. 7 shows an embodiment that substantially differs from the other embodiments. Here, the cover element 40 and the first sub-assembly are connected to a carrier 90 such that a second sub-assembly is formed. The connection between the first sub-assembly and the carrier 90 takes place via the elastic elements 32 in the manner as the connection between the first sub-assembly and the mounting plate takes place in the embodiment of FIG. 1.

Springs 36 extend between the carrier 90 and the mounting plate 30 such that the second sub-assembly can be pressed down relative to the steering wheel body in order to activate the horn. Axial positioning means for positioning the second sub-assembly could be provided but are not shown.

It would be possible to provide horn contacts between the carrier 90 and the mounting plate 30, but here another option is chosen. Under the mounting plate 30 a horn actuation plate 34 is located and at least one horn sensor 70 extends between the mounting plate 30 and the horn actuation plate 34. The horn sensors 70 are biased because of springs 38 pressing the horn actuation plate 34 towards the mounting plate 30. A pusher 39 extends from the carrier 90 through a hole in the mounting plate 30 to the horn actuation plate 34 such that the stress to the horn sensors 70 is relieved when the cover element 40 and thus the second sub-assembly is pressed down. This pusher can either be connected to the carrier 90 or to the horn actuation plate 34.

An additional cover element 100 is provided in the shown embodiment. This additional cover element 100 is non-movable attached to the steering wheel body and is basically annularly shaped meaning that it has a central hole. Radial positioning means extend from the additional cover element 100 to the sidewall 43 of the cover element.

LIST OF REFERENCE NUMBERS 5 steering wheel
10 steering wheel body
11 recess in hub area
12 mounting hook
13 mounting wire
14 steering-wheel-side restraining element (steering wheel side hook)
16 non-axial positioning hole
17 rim
18 first contact
19 steering-wheel-body-side axial positioning element
20 base (housing)
22 bottom
23 sidewall
23a base-side restraining element (base side hook)
24 inflator
25 flange
26 stud
27 collar
28 nut
30 mounting plate
32 elastic element
34 horn actuation plate
36 spring between carrier and mounting plate
38 spring between steering wheel body and horn actuation plate
39 pusher
40 cover element
42 roof
43 cover element side wall
44 cover-element-side hook (cover-element-side-restraining element)
45 window in side wall (cover side restraining element)
46 non-axial poisoning bar
47 spring
48 second contact
49 cover element side axial positioning element
50 outer layer
60 airbag package
62 wrapper
70 horn sensor
80 steering column
90 carrier
100 additional cover element
102 positioning element
A axial positioning means
N non-axial positioning means
R retaining means
S first sub-assembly

The invention claimed is:

1. A steering wheel comprising:
   a steering wheel body,
   a base, said base carrying an inflator and an airbag package, such that said base, said inflator and said airbag package form a first sub-assembly, said base being connected to the steering wheel body at least indirectly via at least one elastic element, such that the sub-assembly can move relative to the steering wheel body in at least one direction so that the whole sub-assembly serves as a vibration damping mass,
   a cover element comprising a roof extending over the airbag package,
   at least one cover-element-side restraining element disposed on the cover element, the at least one cover-element-side restraining element being without function as long as an airbag of the airbag package is not deployed but configured to restrain the cover element when the airbag deploys, and
   at least one horn sensor generating a signal when a pressing force exceeding a predefined value is applied to the roof,
   wherein the cover element is not rigidly connected to the base, such that the sub-assembly can move relative to the steering wheel body under deformation of the elastic element while the cover element does not move relative to the steering wheel body.

2. The steering wheel of claim 1, wherein the cover element comprises a cover element sidewall.

3. The steering wheel of claim 1, wherein the cover element is attached to the steering wheel body in a non-movable manner.

4. The steering wheel of claim 1, wherein the cover element is attached to the steering wheel body in a way that allows a pressing down of the cover element against the steering wheel body.

5. The steering wheel of claim 1, wherein the at least one horn sensor is arranged between a section of the cover element and a section of the steering wheel body.

6. The steering wheel of claim 1, wherein the cover element is attached to the steering wheel body in a non-movable manner, and wherein the at least one horn sensor is in the form of a pressure sensitive electronic sensor being arranged between a section of the cover element and a section of the steering wheel body.

7. The steering wheel of claim 1, wherein the cover element is attached to the steering wheel body in a way that allows a pressing down of the cover element against the steering wheel body, and wherein the at least one horn sensor is arranged between a section of the cover element and a section of the steering wheel body, said horn sensor comprising two electrical contacts being remote from each other when the cover element is not pressed down and being in mechanical contact to each other when the cover element is pressed down.

8. The steering wheel of claim 1, further comprising at least one base-side restraining element configured to interact with the at least one cover-element-side restraining element to restrain the cover element when the airbag deploys.

9. The steering wheel of claim 1, further comprising at least one steering-wheel-body-side restraining element configured to interact with the at least one cover-element-side restraining element to restrain the cover element when the airbag deploys.

10. The steering wheel of claim 1, wherein the cover element is attached to the steering wheel body in a way that allows a pressing down of the cover element against the steering wheel body, and wherein the at least one horn sensor is arranged between a section of the cover element and a section of the steering wheel body, said horn sensor comprising two electrical contacts being remote from each other when the cover element is not pressed down and being in mechanical contact to each other when the cover element is pressed down.

11. The steering wheel of claim 1, further comprising an outer layer being attached to at least a section of the roof of the cover element.

* * * * *